Sept. 6, 1966 R. A. TEAGUE 3,271,066
EXPANSIBLE VEHICLE STORAGE COMPARTMENT
Filed Sept. 8, 1964 2 Sheets-Sheet 1
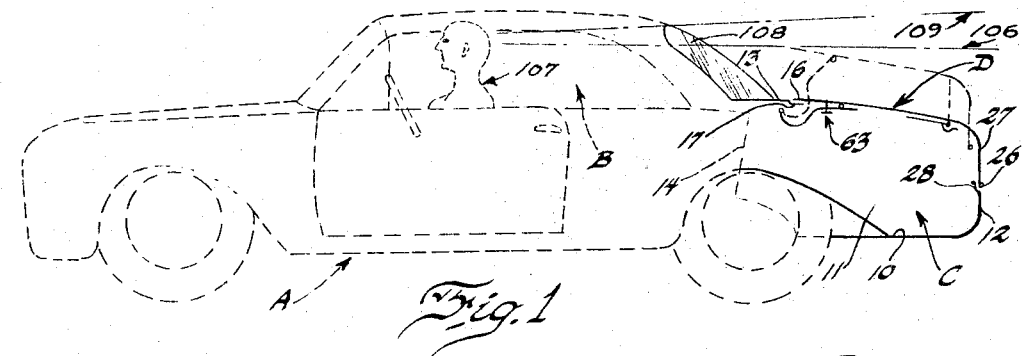
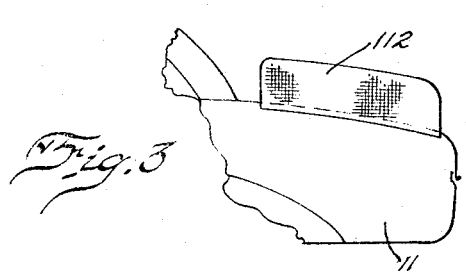
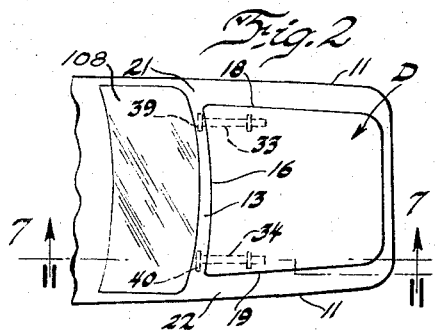
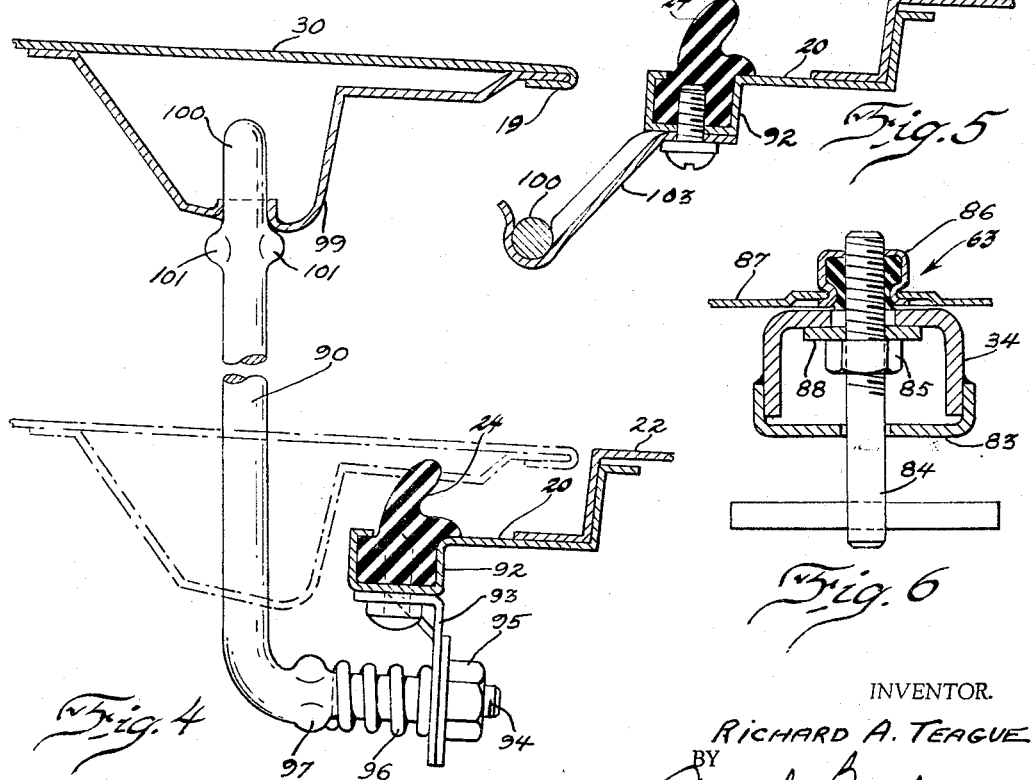
INVENTOR.
RICHARD A. TEAGUE
BY
Carl J. Barbee
ATTORNEY Sept. 6, 1966 R. A. TEAGUE 3,271,066
EXPANSIBLE VEHICLE STORAGE COMPARTMENT
Filed Sept. 8, 1964 2 Sheets-Sheet 2
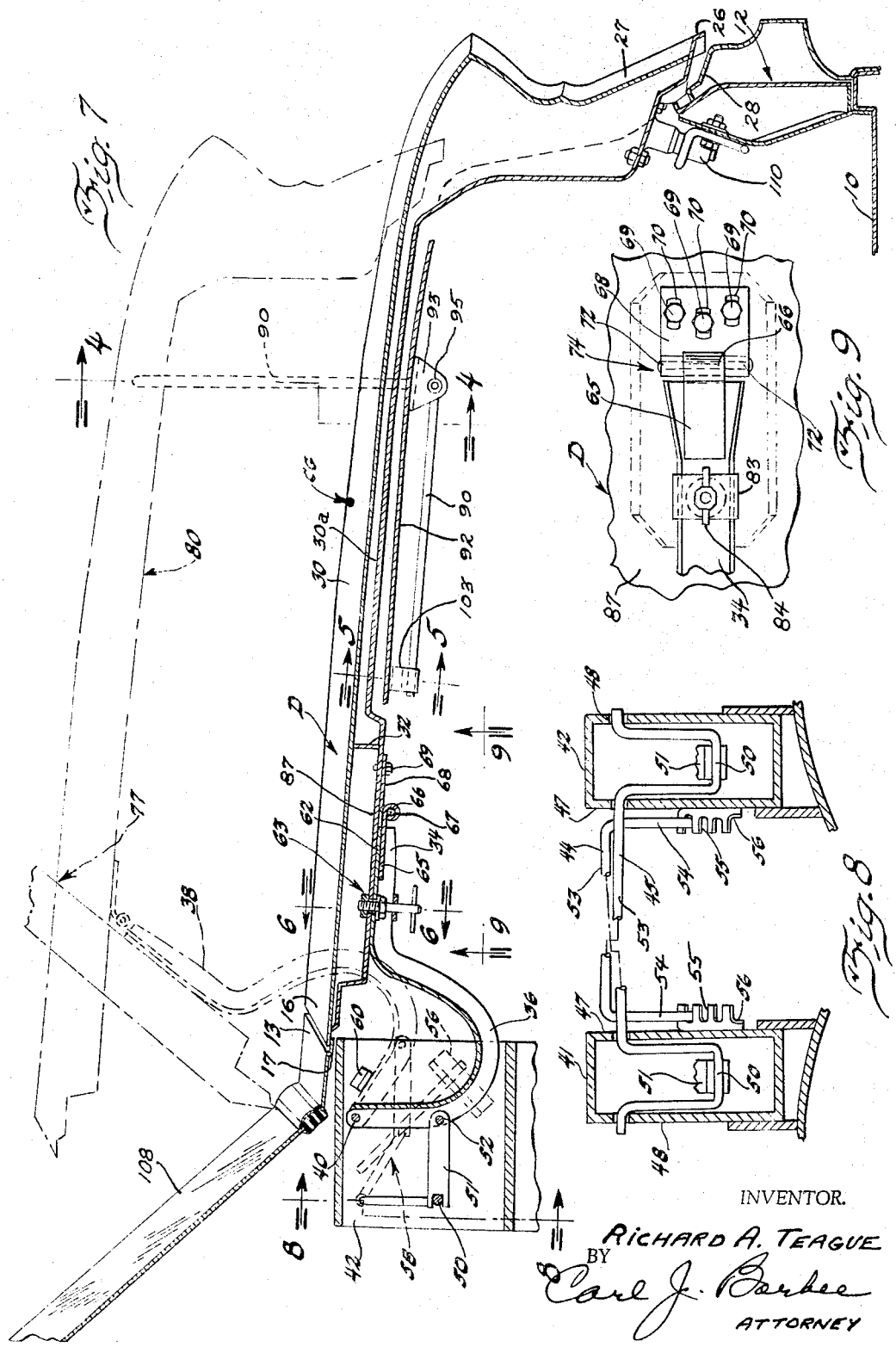
INVENTOR.
RICHARD A. TEAGUE
BY Carl J. Barbee
ATTORNEY

3,271,066
EXPANSIBLE VEHICLE STORAGE COMPARTMENT
Richard A. Teague, Franklin Village, Mich., assignor to American Motors Corporation, Kenosha, Wis., a corporation of Maryland
Filed Sept. 8, 1964, Ser. No. 394,740
5 Claims. (Cl. 296—76)

The invention relates generally to an automobile body having a selectively expansible storage compartment.

The invention has particular reference to an articulated deck cover for a storage compartment with spring means coacting therewith when in elevated position.

The principal object of the invention is to provide a storage compartment with an articulated deck cover for selectively increasing storage compartment area.

A specific object is to provide an articulated deck cover utilizing spring means to advantage when in elevated position.

A further specific object is to provide such a deck cover which can be utilized in a conventional manner when desired.

Other objects and advantages of the invention will be apparent from the ensuing specification and appended drawings in which:

FIGURE 1 is a side elevational view of an automobile in phantom with the storage compartment area shown schematically.

FIGURE 2 is a fragmentary plan view of the vehicle of FIGURE 1.

FIGURE 3 is a fragmentary side view similar to FIGURE 1 and showing a flexible covering that may be employed with the invention.

FIGURE 4 is an enlarged fragmentary sectional view taken on the irregular line 4—4 of FIGURE 7.

FIGURE 5 is an enlarged fragmentary sectional detail view taken on the line 5—5 of FIGURE 7.

FIGURE 6 is an enlarged fragmentary sectional detail view taken on the line 6—6 of FIGURE 7.

FIGURE 7 is a fragmentary sectional view taken on the irregular line 7—7 of FIGURE 2.

FIGURE 8 is a fragmentary sectional detail view taken on the line 8—8 of FIGURE 7, with various components removed.

FIGURE 9 is a fragmentary underneath view of one of the hinge mountings in the area indicated by the line 9—9 of FIGURE 7.

In general, there is shown an automobile indicated generally by the letter A including a passenger compartment B and a storage compartment C situated rearwardly of the passenger compartment. The automobile body, as indicated in FIGURE 1, may be of conventional construction forwardly of the storage compartment area. A closure cover D is provided for the storage compartment.

Referring briefly to FIGURE 1, the storage compartment may include the floor 10, side panels 11, rear deck panel 12, upper deck panel 13 and partition panel 14 which separates the passenger compartment from the storage compartment C.

The deck cover D normally closes off the deck opening which provides access to the storage compartment area. When the deck cover is in closed position, as indicated by solid lines in FIGURE 7, the depth of the storage compartment is dictated by the distance between the floor 10 and the underside of the deck cover.

Under some conditions, it may be desirable to increase the distance between the floor panel 10 and the underside of the deck cover to accommodate, for example, additional pieces of luggage as desired. Under some conditions, the deck cover may be raised to the elevated position as shown in phantom lines in FIGURE 7. While in such elevated position, the deck cover will be suitably anchored to permit normal operation of the vehicle without impairing rearward vision and without undesirable rattling of the deck cover during vehicle operation. The means for accomplishing these desired results will be set forth more fully hereinafter.

Viewing FIGURES 1 and 2, the deck cover may have the general configuration of the deck opening wherein the forward edge of the deck cover 16 may overlap the underlying rear deck panel flange 17 and the side edges 18 and 19 may overlap the marginal ledges 20 which are formed in the side deck panels 21 and 22 adjacent to the deck panel opening. The deck panel ledges 20 are provided with conventional flexible weather strips 24 against which the underside of the deck cover abuts for sealing against the elements.

The lower edge 26 of the rear wall 27 of the deck cover may overlap the rear panel flange 28 for protection against the elements. The deck cover may include a primary exterior sheet metal panel 30 reinforced on the underside thereof as desired to provide the necessary strength for preventing distortion in the cover under normal usage. For example, a box-like structure 32 may be provided for the mounting of each of the hinge arms 33 and 34. The hinge arms may be spaced apart as indicated in FIGURE 2 and such arms may be of channel shape in cross section so as to adequately carry the weight of the deck cover. Each of the two hinge arms include an arcuate portion 36 which permits full swinging of the deck cover from the closed position as indicated in solid lines in FIGURE 7 to the fully opened position as indicated at 38 in dotted lines in FIGURE 7. The arcuate portions assure that the hinge arms will not come into contact with the upper deck panel 13. Each of the hinge arms is mounted on pivots 39 and 40 which are fixed with reference to the vehicle body. For example, suitable brackets 41 and 42 may be secured to the vehicle body and provide a mounting for the pivots of the hinge arms. Such brackets 41 and 42 may be generally box shape in cross section to also accommodate the torsion springs 44 and 45.

Referring to FIGURE 8, the mounting brackets 41 and 42 will be spaced apart appreciably (as indicated in FIGURE 2 by the spacing of the hinge arms 33 and 34). The appropriate spacing of the brackets 41 and 42 is not provided for in the showing of FIGURE 8. The showing of the torsion springs and the bracket mountings in FIGURE 8 is conventional and hence is not shown in any greater detail. The springs, however, do form a part of the inventive subject matter in the manner in which they function in conjunction with the articulated deck cover.

Each spring consists of one end having a U-shaped portion swingably carried by the opposite side walls 47 and 48 of the mounting brackets with the web portions 50 engaged by the links 51. Such links are provided with suitable notches in the forward ends thereof as to substantially encircle the spring webs 50 and the rearward ends of such links are pivotally carried on pivot pins 52 which are anchored to the hinge arms. Each spring includes an elongated central portion 53 which terminates with a downwardly bent end 54 which is received in one of the bracket notches 55. The tension of each spring is adjustable depending upon which notch 55 the spring end is mounted in. The brackets 56 are anchored to the side walls 47 as by means of welding.

Referring to FIGURE 7, when the deck cover is in closed position, each of the springs is energized as a result of link 51 acting thereon to swing the U-shaped portion from the dotted line position indicated at 58 to the position as indicated in solid lines in FIGURE 7. Each of the mounting brackets 41 and 42 has a stop 60 anchored to a side wall and projecting into the path of each hinge arm 33 and 34 so as to limit the travel of each hinge arm in deck cover raising direction. The upper limit of travel of each hinge arm is indicated in FIGURE 7 with the dotted line showing of the hinge arm as being in engagement with the stop 60. Under normal conditions, it is desirable for each of the springs 44 and 45 to have adequate unspent energy so as to raise the deck cover to the fully raised position as indicated in FIGURE 7. As the cover approaches fully raised position required spring energy progressively decreases, as will be more fully explained hereinafter.

Each hinge arm has its rearward end 62 removably secured to the underside of the deck cover as by means of a fastener assembly indicated generally by the numeral 63, the details of which will be explained more fully hereinafter.

Referring to FIGURE 9, each hinge arm has a hinge strap 65 secured thereto as by welding. The hinge strap has an eye 66 formed at its free end through which hinge pintle 67 projects. Each hinge strap cooperates with a respective hinge butt 68 which is secured to the underside of the deck cover as by means of bolts 69. Elongated slots 70 in the hinge butts permit some fore and aft adjustment of the deck cover with reference to the deck opening for aligning purposes. Each hinge butt, of course, has appropriate eye portions 72 formed thereon which encircle the hinge pintles 67. When the fastener assembly 63 anchors the end 34 of each hinge arm to the underside of the deck cover, then the hinge assembly, as identified generally by the numeral 74, is immobilized and the deck cover functions in the manner of a conventional deck cover wherein the cover is in the position of tilt as indicated in phantom at 77 in FIGURE 7. When it is desired to have the deck cover in the elevated, but substantially horizontal, position as indicated generally by the numeral 80 in FIGURE 7, then it is only necessary to unloosen the fastening assembly 63 in order to mobilze the hinge assembly 74.

The fastener assembly 63 includes an apertured bracket 83 which is secured to the opposite side walls of the hinge arm and through which the shank of the manually operated hand screw 84 projects. A nut 85 may be secured to the threaded shank of the hand screw and internally threaded nut 86 is anchored to the wall 87 of the deck cover for receiving the threaded end of the hand screw 84. To immobilze the hinge 74 it is only necessary to unthread the hand screw from the nuts 86 so that the hinge arms are released from the deck cover panel. The bracket 83 always contains the hand screw assembly for refastening, when desired, to the nuts 86. The lock washer 88 is likewise permanently contained on the threaded shank of hand screw 84.

Referring to FIGURES 1, 4, 5 and 7, there is shown a support rod 90 which holds the rearward portion of the deck cover in elevated position when in use. It will be understood that there are similarly mounted support rods on each side of the storage compartment, only one of such rods being shown in each of the aforementioned figures. Only one of the support rods assemblies need be described in detail. The side panel ledge 20 has a weather strip accommodating channel 92 formed thereon and a bracket 93 is secured to the underside of such channel. The support rod has an outwardly directed threaded end 94 secured to the bracket by means of nut 95 and a spring 96 acts against the bosses 97 for assisting in preventing rattling. The underside of the rear deck cover is formed with an apertured boss 99 through which the upper end 100 of the support rod projects. The bosses 101 are engaged by the deck cover boss 99 to hold the rearward portion of the deck cover in the desired elevated height, as shown in FIGURES 1 and 7. A retaining clip 103 is anchored to the weather strip channel 92 for receiving the forward end 100 of the support rod when not in use.

Referring to FIGURES 2 and 7, it should be explained that the rear deck cover inner and outer panels, 30 and 30a respectively, are shown as being taken on a straight section line 7—7 of FIGURE 2 and a portion of the side deck channel panel 92 is also shown—being taken on the irregular secondary section line 7—7 of FIGURE 2 in order to illustrate the mounting of the bracket 93 which carries the support rod 90.

When the hand screws 84 are engaged with nuts 86 immobilizing the hinges 74, the deck cover swings about the horizontal axes of the hinge pins 39 and 40, which serve as the fulcrums and the center of gravity of the deck cover may be situated approximately as indicated at C.G. (see FIGURE 7). The weight of the deck cover which must be overcome by the torsion springs 44 and 45 is at its greatest. The stored energy in the springs, however, is also at a maximum and is adequate to cause the deck cover to be lifted without manual assistance to the fully raised position as indicated at 77 in FIGURE 7. As the torsion springs lose energy in raising the deck cover toward fully raised position, the center of gravity shifts, lessening the weight load being lifted by the springs. As previously mentioned, the springs still have some stored energy when the deck cover is in the fully raised position 77.

This unspent energy serves to more than adequately hold the forward portion of the deck cover in the elevated position 80 when the hinges 74 are mobilized since the support rods 90 are carrying the weight of the rearward portion of the deck cover. The weight which the support rods 90 carry causes an appreciable lessening of the weight load which the hinge arms 33 and 34 carry, thereby permitting the springs 44 and 45 to exert a considerable amount of thrust against the forward portion of the deck cover to assist in preventing rattling when the deck cover is in the elevated position 80 as shown in phantom lines in FIGURE 1.

The distance between each of the hinge arm pins 39 and 40 and its respective hinge pintle 67 is carefully calculated so as to determine the height of the forward portion of the deck cover when in the fully elevated position 80. Viewing FIGURE 1, it will be noted that this height is indicated by the line 106 and when the driver 107 of the automobile is operating the vehicle, he can use the conventional rear view mirror for obtaining appropriate vision through the vehicle rear window 108 and the range of vision would be approximately as indicated between the lines 106 and 109. Thus, the elevated height of the deck cover is predetermined so as not to impair adequate vision by the operator of the vehicle through the rear window.

When the deck cover is in fully closed position a conventional locking device 110 may be employed for releasably anchoring the rearward portion of the deck cover to the rear deck panel 12. The details of the locking device forms no part of the invention and hence are not shown in detail.

When the deck cover is in the elevated position 80, a flexible covering 112, as shown in FIGURE 3, may be utilized to close off the expanded storage area during operation of the vehicle.

I claim:
1. A vehicle body comprising:
   (a) a passenger compartment;
   (b) a storage compartment rearwardly of the passenger compartment and being open at its upper end;
   (c) a cover for closing off the open upper end of the storage compartment;
   (d) spaced hinge arms pivotally connected at their forward ends to the vehicle body and pivotally connected at their rearward ends to the cover;
   (e) said hinge arms being removably anchored to the cover intermediately of the forward and rearward pivots whereby to selectively immobilize the rearward pivots.

2. A vehicle body comprising:
(a) a passenger compartment;
(b) a storage compartment rearwardly of the passenger compartment and being open at its upper end;
(c) a cover for closing off the open upper end of the storage compartment;
(d) spaced hinge arms pivotally connected at their forward ends to the vehicle body and pivotally connected at their rearward ends to the cover;
(e) said hinge arms being removably anchored to the cover intermediately of the forward and rearward pivots whereby to selectively immobilize the rearward pivots.
(f) the distance from the rearward pivots to the rear end of the deck cover being substantially greater than the distance from the rearward pivots to the forward end of the cover and the weight of that portion of the cover between the rearward pivots and the rear end of the cover being substantially greater than the weight of that portion of the cover between the rearward pivots and the forward end of the cover.

3. A vehicle body comprising:
(a) a passenger compartment;
(b) a storage compartment rearwardly of the passenger compartment and being open at its upper end;
(c) a cover for closing off the open upper end of the storage compartment;
(d) spaced hinge arms pivotally connected at their forward ends to the vehicle body and pivotally connected at their rearward ends to the cover;
(e) said hinge arms being removably anchored to the cover intermediately of the forward and rearward pivots whereby to selectively immobilize the rearward pivots.
(f) the distance from the rearward pivots to the rear end of the deck cover being substantially greater than the distance from the rearward pivots to the forward end of the cover and the weight of that portion of the cover between the rearward pivots and the rear end of the cover being substantially greater than the weight of that portion of the cover between the rearward pivots and the forward end of the cover.
(g) resilient means carried by the body for continuously urging the cover in a direction toward raised position and stop means for limiting the movement of the cover in such direction.

4. A vehicle body comprising:
(a) a passenger compartment;
(b) a storage compartment rearwardly of the passenger compartment and being open at its upper end;
(c) a cover for closing off the open upper end of the storage compartment;
(d) spaced hinge arms pivotally connected at their forward ends to the vehicle body and pivotally connected at their rearward ends to the cover;
(e) said hinge arms being removably anchored to the cover intermediately of the forward and rearward pivots whereby to selectively immobilize the rearward pivots.
(f) the distance from the rearward pivots to the rear end of the deck cover being substantially greater than the distance from the rearward pivots to the forward end of the cover and the weight of that portion of the cover between the rearward pivots and the rear end of the cover being substantially greater than the weight of that portion of the cover between the rearward pivots and the forward end of the cover.
(g) resilient means carried by the body for continuously urging the cover in a direction toward raised position and stop means for limiting the movement of the cover in such direction, said resilient means being energized when the cover is engaged with the stop means and when the rearward pivots are mobilized and when the cover is swung about the rearward pivots to a generally horizontal position.

5. A vehicle body as set forth in claim 4 wherein means are carried on the vehicle body for supporting the rearward portion of the cover when it is in elevated and generally horizontal position.

References Cited by the Examiner

UNITED STATES PATENTS

| | | | |
|---|---|---|---|
| 2,991,117 | 7/1961 | Tatter | 16—164 |
| 3,233,936 | 2/1966 | Jakosky | 296—76 |

BENJAMIN HERSH, *Primary Examiner.*

J. H. BRANNEN, *Assistant Examiner.*